Figure 1:
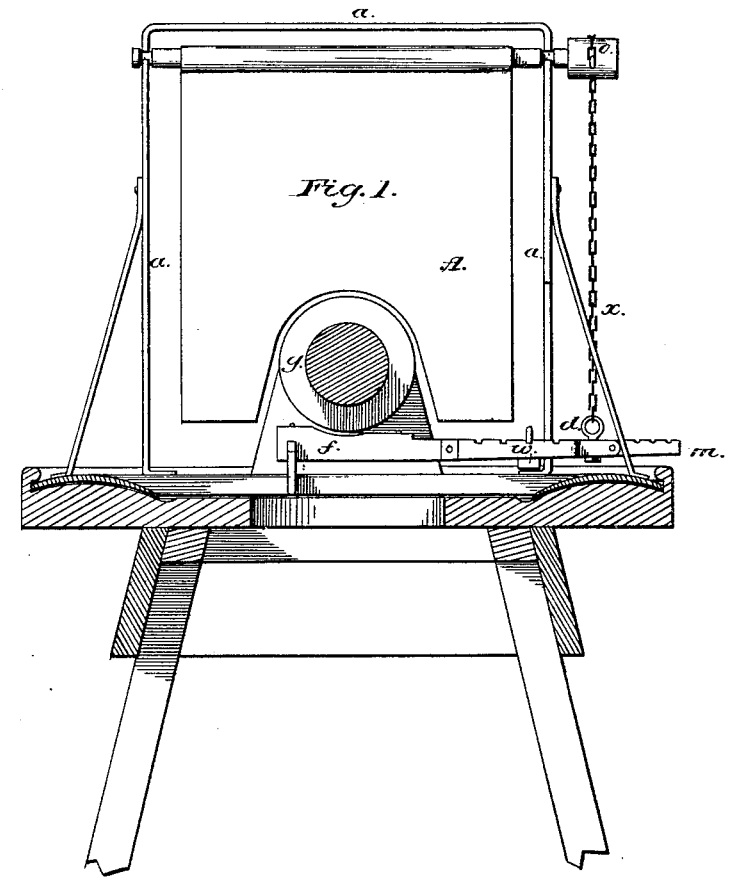
Figure 2:
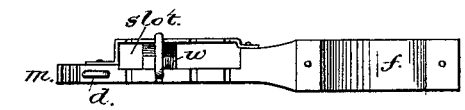

O. P. McDONALD.
AUTOMATIC GOVERNOR FOR WIND-WHEELS.

No. 188,747. Patented March 27, 1877.

UNITED STATES PATENT OFFICE.

OLIVER P. McDONALD, OF VOLUSIA COUNTY, FLORIDA.

IMPROVEMENT IN AUTOMATIC GOVERNORS FOR WIND-WHEELS.

Specification forming part of Letters Patent No. 188,747, dated March 27, 1877; application filed October 11, 1875.

*To all whom it may concern:*

Be it known that I, OLIVER P. McDONALD, residing near Port Orange, in the county of Volusia and State of Florida, have invented a new and useful Automatic Governor for Wind-Wheels, which invention is fully set forth in the following specification, reference being had to the accompanying drawings.

The object of my invention is to secure and maintain perfectly uniform and steady motion in the wind-wheel at any desired speed, no matter how variable or violent the wind may be, provided, of course, that it is sufficiently strong to keep up the required speed.

This is accomplished by automatic operation of a brake in the following manner: In a vertical frame, $a\ a\ a$, rising from the turn-table in the rear of the wind-wheel, (as ordinarily constructed,) is suspended an independent vane, A, on an axle at right angles with the shaft of the wind-wheel, thus presenting at all times the broad side of the vane to the wind. At any convenient point on the axle, either inside or outside of the bearings, is a small stationary pulley, $o$, having on the front side a hook or equivalent, to which one end of a chain, $x$, is attached. The chain, passing over the top of the pulley and down the rear side, is attached to a threaded bolt, $d$, which passes loosely through a hole in the handle of the brake $f\ m$, with a nut on the under side to regulate the length of the chain. On the shaft of the wind-wheel, at any desired point, is a friction-wheel, $g$, with which the brake $f\ m$ engages. The brake passing under the friction-wheel, and having a notch on the under side, rests on a notched fulcrum at $f$. The two notches coming together serve to keep the brake from slipping in any direction. The fulcrum $f$ is attached to a radial arm or cross-bar of the turn-table.

Now, it will be readily understood that the action of the wind on the broad side of the vane A will cause it to rotate partially on its axis, by driving its lower end in a direction immediately back from the wind-wheel, and by such motion will wind up on the pulley $o$ a corresponding portion of the chain $x$, and by this means bring the brake in connection with the friction-wheel $g$, with a force corresponding exactly with the greater or less violence of the wind, and by the friction thus produced and exerted will instantly counterbalance any amount of power exerted on the wind-wheel. In other words, the two antagonizing forces may be made to balance each other exactly, and the wind-wheel is powerless to move. Now, let us place a weight, $w$, on the handle of the brake, and this will give the wind-wheel an unobstructed limited power, or the required speed; it is evident now, that any and all power beyond this limit will be exactly counterbalanced by the brake. If it is desired to increase the speed, move the weight $w$ farther from the fulcrum-point of the brake; but if it is desired to diminish the speed, move it in the opposite direction.

By this means perfect uniformity of motion at any desired speed may be maintained under all the varying forces of the wind, from a gentle breeze to the violence of a tornado.

The handle of the brake is provided with a long slot in which the weight $w$ sets, and has on either side of the same notches, to hold the weight at any desired point, the weight having short arms with feather edges on its under side to rest in the notches.

It is evident that this invention is equally applicable to and is intended for stationary wind-wheels, as well as to those that face about to the wind.

I claim as my invention—

The combination, with the shift of a wind-wheel, of the governing-vane A, pulley $o$, chain $x$, and brake $f\ m$, as and for the purpose described and set forth.

OLIVER P. McDONALD.

Witnesses:
CHAMP H. SPENCER,
PETER B. DOBBINS.